US010873896B2

(12) United States Patent
Taneja

(10) Patent No.: US 10,873,896 B2
(45) Date of Patent: *Dec. 22, 2020

(54) MINIMIZING LINK LAYER DISCOVERY BASED ON ADVERTISING ACCESS TECHNOLOGY PARAMETERS IN A MULTIMODE MESH NETWORK

(71) Applicant: Cisco Technology, Inc., San Jose, CA (US)

(72) Inventor: Mukesh Taneja, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/152,131

(22) Filed: Oct. 4, 2018

(65) Prior Publication Data

US 2019/0037473 A1    Jan. 31, 2019

Related U.S. Application Data

(63) Continuation of application No. 14/644,237, filed on Mar. 11, 2015, now Pat. No. 10,129,813.

(51) Int. Cl.
*H04W 40/24* (2009.01)
*H04W 76/14* (2018.01)
(Continued)

(52) U.S. Cl.
CPC ......... *H04W 40/246* (2013.01); *H04W 8/005* (2013.01); *H04W 76/10* (2018.02);
(Continued)

(58) Field of Classification Search
CPC ... H04W 40/246; H04W 76/14; H04W 76/10; H04W 8/005; H04W 76/15; H04W 80/02; H04W 80/04; H04W 84/18
See application file for complete search history.

(56) References Cited

U.S. PATENT DOCUMENTS 7,653,392 B2   1/2010 Ovadia et al.
8,527,457 B2   9/2013 Moon et al.
(Continued)

OTHER PUBLICATIONS

Puttonen et al., "Multiple Interface Management of Moltihomed Mobile Hosts in Heterogeneous Wireless Environments", [online] 2009 Eighth International Conference on Networks, [retrieved on Nov. 25, 2014]. Retrieved from the Internet: <URL: http://ieeexplore.ieee.org/stamp/stamp.jsp?tp=&arnumber=4976695>, pp. 324-331.

(Continued)

*Primary Examiner* — Christopher M Crutchfield
*Assistant Examiner* — Tito Q Pham
(74) *Attorney, Agent, or Firm* — Leon R. Turkevich

(57) ABSTRACT

In one embodiment, a method comprises establishing, by a first network device in a mesh network, a first connection with a second network device according to a prescribed discovery operation of a first link layer access protocol; advertising via the first connection, by the first network device to the second network device, link layer parameters used by the first network device to establish a second connection according to a second link layer access protocol; and the first network device minimizing a corresponding discovery operation of the second link layer access protocol during establishment of the second connection with the second network device, based on the link layer parameters advertised by the first network device to the second network device.

20 Claims, 6 Drawing Sheets

(51) Int. Cl.
| | |
|---|---|
| *H04W 76/10* | (2018.01) |
| *H04W 8/00* | (2009.01) |
| H04W 84/18 | (2009.01) |
| H04W 80/02 | (2009.01) |
| H04W 80/04 | (2009.01) |
| H04W 76/15 | (2018.01) |

(52) U.S. Cl.
CPC ............ *H04W 76/14* (2018.02); *H04W 76/15* (2018.02); *H04W 80/02* (2013.01); *H04W 80/04* (2013.01); *H04W 84/18* (2013.01)

(56) References Cited

U.S. PATENT DOCUMENTS

| | | | |
|---|---|---|---|
| 9,750,022 B2 | 8/2017 | Liu et al. | |
| 2005/0246193 A1* | 11/2005 | Roever | G06Q 30/06 705/35 |
| 2010/0098407 A1* | 4/2010 | Goswami | H04B 10/032 398/5 |
| 2012/0100803 A1* | 4/2012 | Suumaki | H04W 36/0072 455/41.1 |
| 2015/0319029 A1* | 11/2015 | Abraham | H04W 76/14 370/310 |
| 2016/0164725 A1* | 6/2016 | Wu | H04L 12/40 713/168 |
| 2016/0269972 A1 | 9/2016 | Taneja | |

OTHER PUBLICATIONS

Koubaa et al., "GTS Allocation Analysis in IEEE 802.15.4 for Real-Time Wireless Sensor Networks", [online], 2006 IEEE, [retrieved on Jan. 23, 2015]. Retrieved from the Internet: <URL: http://www.cecs.uci.edu/~papers/ipdps06/pdfs/132-WPDRTS-paper-1.pdf>, 8 pages.

Adams, "An Introduction to IEEE STD 802.15.4", [online], 2006 IEEE, [retrieved on Jan. 23, 2015]. Retrieved from the Internet: <URL: https://www.sonoma.edu/users/f/farahman/sonoma/courses/cet543/resources/802_intro_01655947.pdf>, pp. 1-8.

Wikipedia, "IEEE 802.21", [online], Dec. 31, 2014, [retrieved on Feb. 24, 2015]. Retrieved from the Internet: <URL: http://en.wikipedia.org/w/index.php?title=IEEE_802.21&printable=yes>, pp. 1-3.

Cisco, "Cisco Connected Grid Network Management System", [online], 2012 Cisco, [retrieved on Nov. 24, 2014]. Retrieved from the Internet: <URL: http://www.cisco.com/c/en/us/products/collateral/cloud-systems-management/connected-grid-network-management-system/qa_c67-697079.pdf>, 3 pages.

Bajko, "Locating IEEE 802.21 Mobility Services Using DNS", Network Working Group, Request for Comments: 5679, Dec. 2009, pp. 1-9.

Winter, Ed., et al., "RPL: IPv6 Routing Protocol for Low-Power and Lossy Networks", Internet Engineering Task Force (IETF), Request for Comments: 6550, Mar. 2012, pp. 1-157.

Shelby et al., "The Constrained Application Protocol (CoAP)", Internet Engineering Task Force (IETF), Request for Comments: 7252, [online], Jun. 2014, [retrieved on Jan. 21, 2015]. Retrieved from the Internet: <URL: http://tools.ietf.org/pdf/rfc7252.pdf>, pp. 1-112.

Wikipedia, "Handover", [online], Feb. 22, 2015, [retrieved on Feb. 24, 2015]. Retrieved from the Internet: <URL: http://en.wikipedia.org/w/index.php?title=Handover&printable=yes>, pp. 1-7.

Lessmann et al., "Heterogeneous Wireless Networks and IEEE 802.21", [online], Nov. 9, 2009, [retrieved on Nov. 24, 2014]. Retrieved from the Internet: <URL: https://www.google.com/url?sa=t&rct=j&q=&esrc=s&source=web&cd=3&cad=rja&uact=8&ved=0CD4QFjAC&url=https%3A%2F%2F%2Fmentor.ieee.org%2F802.21%2Fdcn%2F09%2F21-09-0187-00-0000-heterogeneous-wireless-networks-and-ieee-802-21.ppt&ei=iaZzVO-mGae1sASL04KgDw&usg=AFQjCNFwxFenHMmaVv9AzVccTD3bmHNPpA&bvm=bv.80185997,d.cWc>, 16 pages.

* cited by examiner

MINIMIZING LINK LAYER DISCOVERY BASED ON ADVERTISING ACCESS TECHNOLOGY PARAMETERS IN A MULTIMODE MESH NETWORK

This application is a Continuation of application Ser. No. 14/644,237, filed Mar. 11, 2015.

TECHNICAL FIELD

The present disclosure generally relates to establishing connections of respective access technologies using link layer discovery in a multimode mesh network, for example an Internet of Things (IoT) network having one or more network devices having more than one link layer interface.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A multimode mesh network is a mesh network having one or more network devices ("nodes") that can support more than one link layer interface. For example, a node in a mesh network may support one or more physical/link layer interfaces operating under different prescribed link layer access protocols such as IEEE802.15.4 (g/e/ . . . ), IEEE802.15.1 (Bluetooth), Long Term Evolution (LTE), WiFi-Direct, LTE-Direct, WiFi, and/or and Power Line Communication (PLC, IEEE1901). A network device in an IoT network can be implemented as a temperature sensor, a smart meter, a video surveillance camera, an actuator device on a robot, and/or a physical controller switch, etc. Each link layer access protocol specifies a prescribed discovery operation comprising a sequence of operations that need to be performed to enable a network device to acquire and establish a communication link with another network device according to a prescribed access technology, for example channel discovery and negotiation, time slot synchronization, frame boundary alignment, etc.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
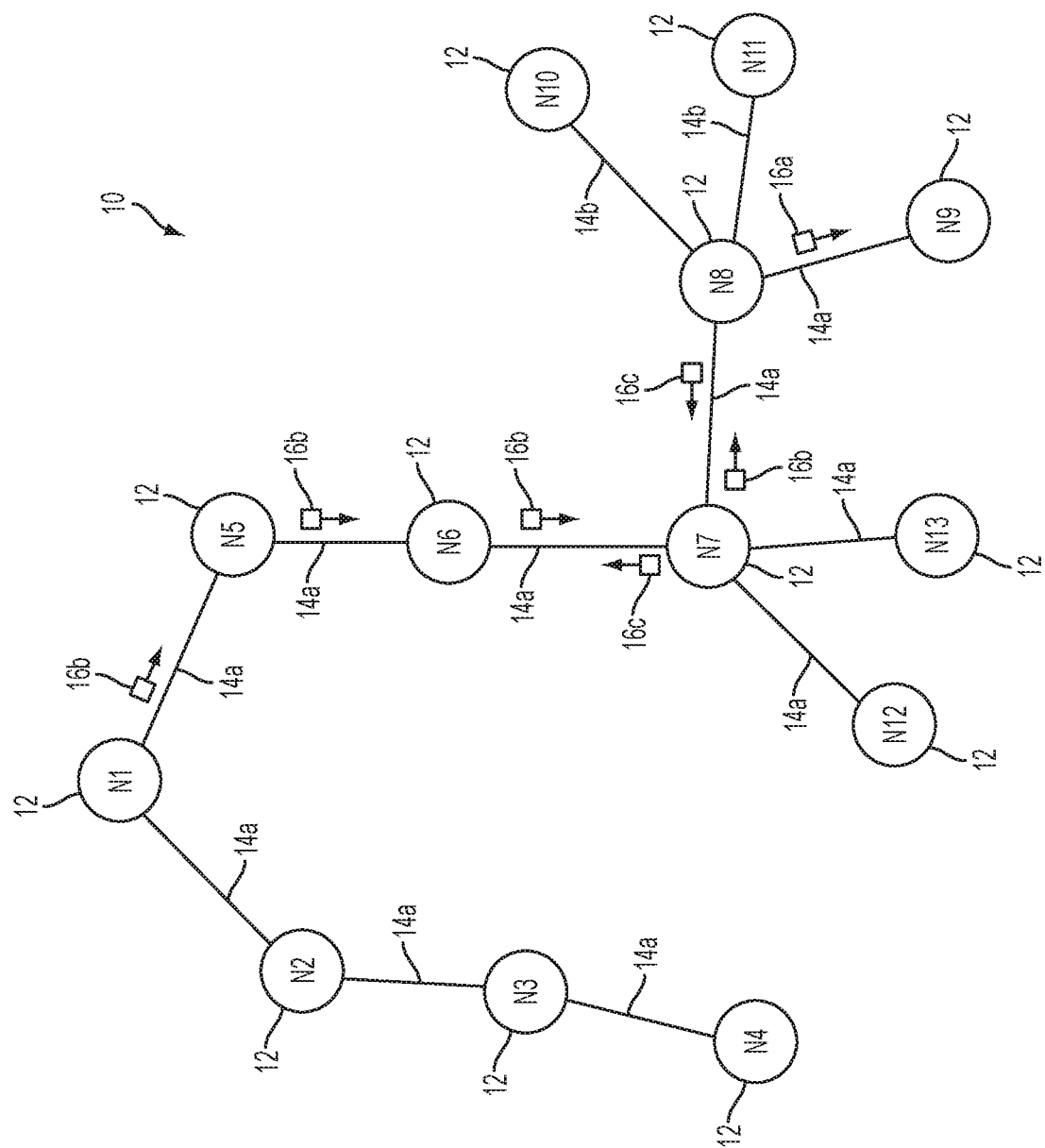
FIGS. 1A and 1B illustrate an example mesh network having one or more apparatus for advertising, via a first connection established according to a first link layer access protocol, link layer parameters used to minimize prescribed discovery operations during establishment of a second connection according to second link layer access protocol, according to an example embodiment.

In one embodiment, a method comprises establishing, by a first network device in a mesh network, a first connection with a second network device according to a prescribed discovery operation of a first link layer access protocol; advertising via the first connection, by the first network device to the second network device, link layer parameters used by the first network device to establish a second connection according to a second link layer access protocol; and the first network device minimizing a corresponding discovery operation of the second link layer access protocol during establishment of the second connection with the second network device, based on the link layer parameters advertised by the first network device to the second network device.

In another embodiment, an apparatus comprises a first device interface circuit, a second circuit, and a second device interface circuit. The first device interface circuit is configured for establishing, in a mesh network, a first connection with a network device according to a prescribed discovery operation of a first link layer access protocol. The second circuit is configured for outputting to the network device, via the first connection established by the first device interface circuit, an advertisement specifying link layer parameters used by the apparatus to establish a second connection according to a second link layer access protocol. The second device interface circuit is configured for minimizing a corresponding discovery operation of the second link layer access protocol during establishment of the second connection with the network device, based on the link layer parameters specified in the advertisement.

In another embodiment, logic is encoded in one or more non-transitory tangible media for execution by a machine and when executed by the machine operable for: establishing, by a first network device in a mesh network, a first connection with a second network device according to a prescribed discovery operation of a first link layer access protocol; advertising via the first connection, by the first network device to the second network device, link layer parameters used by the first network device to establish a second connection according to a second link layer access protocol; and the first network device minimizing a corresponding discovery operation of the second link layer access protocol during establishment of the second connection with the second network device, based on the link layer parameters advertised by the first network device to the second network device.

In another embodiment, a method comprises: establishing, by a first network device in a mesh network, a first connection with a second network device according to a prescribed discovery operation of a first link layer access protocol; receiving via the first connection, by the first network device from the second network device, link layer parameters used by the second network device to establish a second connection according to a second link layer access protocol; and the first network device bypassing at least a portion of a corresponding discovery operation of the second link layer access protocol during establishment of the second connection with the second network device, based on applying the link layer parameters advertised by the second network device.

Detailed Description

Particular embodiments enable a first network device to minimize link layer discovery operations of a prescribed link layer access protocol used to establish a connection using a first access technology, based on having previously advertised the link layer parameters used by the first network device to establish the connection according to the prescribed link layer access protocol. Each access technology requires a network device to implement specific parameters in order to establish a connection according to the access technology, since the values of the specific parameters are not fixed or static, a link layer access protocol is required to enable peer network devices to "exchange" information to establish a connection between the peer network devices.

Existing link layer access protocols employ a corresponding discovery operation that requires a second network device to learn, in a prescribed sequence, the link layer parameters employed by a first network device, for example based on trial-and-error discovery of timing beacons or probe messages. For example, network devices may be required to detect each other by transmitting messages on different wireless channels to identify an active channel, negotiation of group ownership (e.g., Peer-to-Peer (P2P) Group Owner (GO) vs. P2P Clients in WiFi-Direct), exchange of security keys (e.g., WiFi Protected Setup (WPS) provisioning), etc.

According to an example embodiment, the advertisement of link layer parameters for a first link layer access protocol (e.g., WiFi-Direct parameters) by a first network device on a first connection established according to a second link layer access protocol (e.g., an IEEE 802.15.4 link layer connection) enables a second network device to bypass at least a portion of the corresponding discovery operation, based on applying the advertised link layer parameters as a "shortcut" to bypass the existing discovery operations that normally must be performed for the second network device to "learn" the link layer parameters.

Hence, a network device can minimize a discovery operation of a link layer access protocol (e.g., WiFi-Direct) based on advertising its corresponding link layer parameters via another connection (e.g., via an IEEE 802.15.4 link layer connection or an IP connection overlying the link layer connection), and enabling another network device to bypass at least a portion of the corresponding discovery operation using the advertised link layer parameters.

Figure 1B:
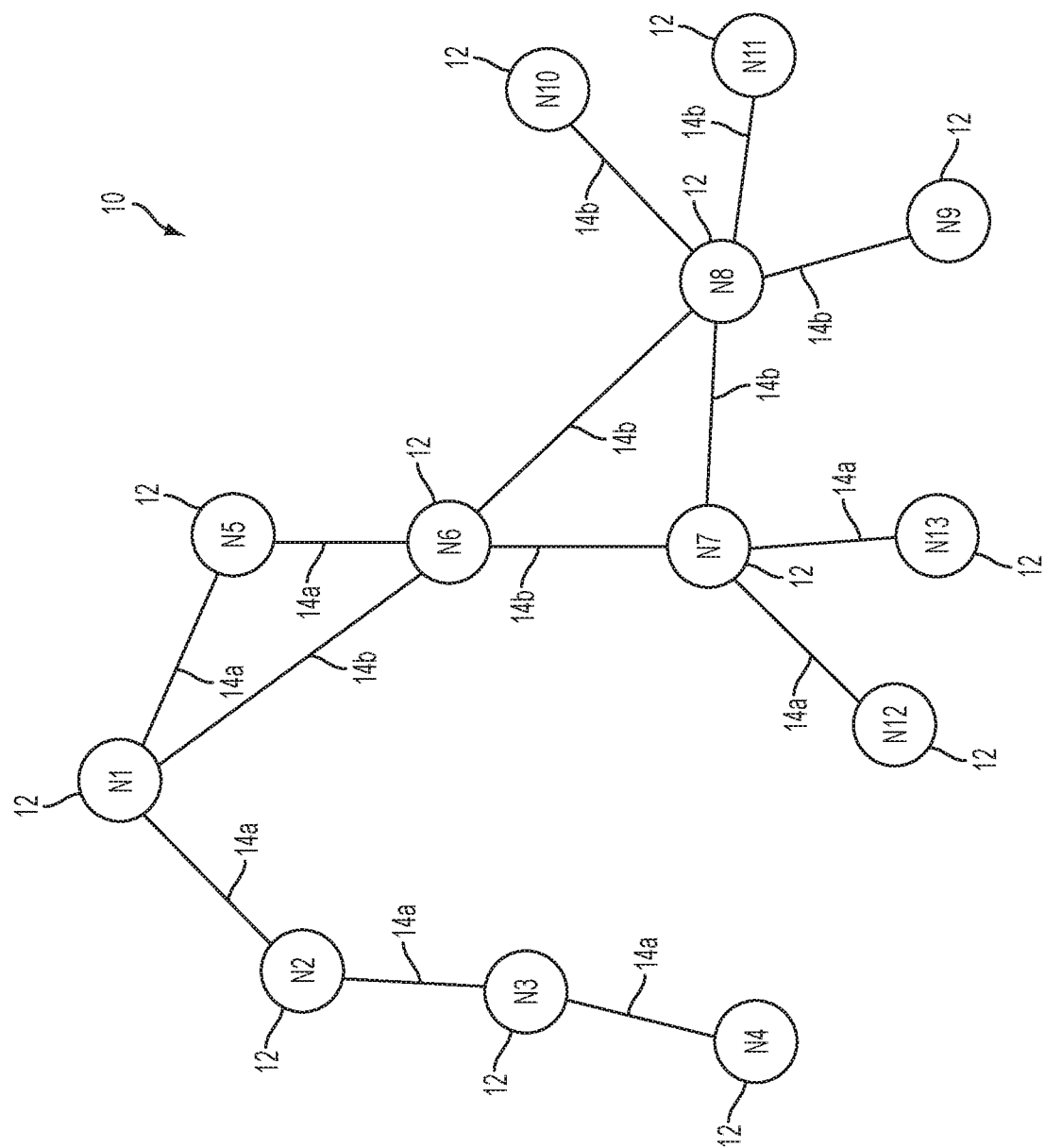

FIGS. 1A and 1B are diagrams illustrating an example multimode mesh network 10 having multiple network devices 12, according to an example embodiment. Each network device (i.e., apparatus) 12 is a physical machine (i.e., a hardware device) configured for implementing network communications with other physical machines 12 via the network 10. The term "configured for" or "configured to" as used herein with respect to a specified operation refers to a device and/or machine that is physically constructed and arranged to perform the specified operation. Hence, the apparatus 12 is a network-enabled machine (e.g., user device, network gateway device, sensor device, actuator device, etc.) implementing network communications via the network 10.

Each of the network devices (N1, N2, . . . N13) 12 can establish a link layer connection 14 (e.g., 14a, 14b, etc.) with one or more other network devices 12 based on executing a prescribed discovery operation of at least one link layer protocol: as illustrated in FIGS. 1A and 1B, the network devices N2, N3, N4, and N5 are single mode-only devices that operate only according a first link layer protocol, for example IEEE 802.15.4, to establish the IEEE 802.15.4 link layer connections 14a; the network devices N10 and N11 are single mode-only devices that operate according only according to a second link layer protocol, for example WiFi-Direct, to establish the WiFi-Direct link layer connections 14b; the network devices N1, N6, N7, N8, and N9 are configured as multimode network devices that can establish an IEEE 802.15.4 link layer connection 14a and/or a WiFi-Direct link layer connection 14b. Any one of the multimode network devices N1, N6, N7, N8, and N9 can be configured to operate either in concurrent mode (i.e., concurrent establishment of IEEE 802.15.4 link layer connection 14a and a WiFi-Direct link layer connection 14b), or non-concurrent mode where only one connection 14a or 14b is active at any one time.

Hence, the network 10 can include single mode-only devices that establish only IEEE 802.15.4 link layer connections 14a, single mode-only devices that establish only WiFi-Direct link layer connections 14b, non-concurrent mode multimode network devices that can establish connections 14a or 14b, and/or concurrent mode multimode network devices that can concurrently establish and maintain connections 14a and 14b. Any one of the network devices 12 also could utilize one or more of another connection type, for example IEEE802.15.4 (g/e/ . . . ), IEEE802.15.1 (Bluetooth), LTE, LTE-Direct, WiFi, and/or and Power Line Communication (PLC, IEEE1901).

According to an example embodiment, the multimode network devices N1, N6, N7, N8, and N9 can advertise, via a first connection (e.g., 14a), link layer parameters for establishing a second connection 14b based on the multimode network device (e.g., N8) outputting one or more messages 16 specifying the link layer parameters. Hence, a multimode network device (e.g., N9) receiving the message 16 from the sourcing multimode network device (e.g., N8) can bypass at least a portion of a corresponding discovery operation based on applying the received link layer parameters of the source multimode network device (e.g., N9) to establish the second connection (e.g., 14b between N8 and N9). Further, the sourcing multimode network device (e.g., N8) can minimize the corresponding discovery operation, based on the advertised link layer parameters, based on permitting the peer multimode network device (e.g., N9) to bypass the corresponding discovery operation.

Consequently, the multimode network devices N1, N6, N7, N8, and N9 can establish second connections according to a second link layer access protocol (e.g., 14b), following initial establishment of first connections according to first link layer access protocol (e.g., 14a), without the transition delay normally associated with shutting down the physical layer transceiver (PHY) circuit configured for providing the first connection (e.g., 14a) (for non-concurrent devices), initiating the second PHY circuit configured for establishing the second connection (e.g., 14b), and executing the prescribed discovery operation in its entirety before establishing the second connection.

As described in further detail below, the link layer parameters can be transmitted in the message 16 in various forms, for example within a payload of a link layer packet 16a, an Internet Protocol (IP) based packet such as a Destination Oriented Directed Acyclic Graph (DODAG) Information Object (DIO) 16*b* according to the Request for Comments (RFC) 6550, a Destination Advertisement Object (DAO) 16*c* according to RFC 6550, or a Constrained Application Protocol (CoAP) message (described in FIG. 3).

Figure 2:
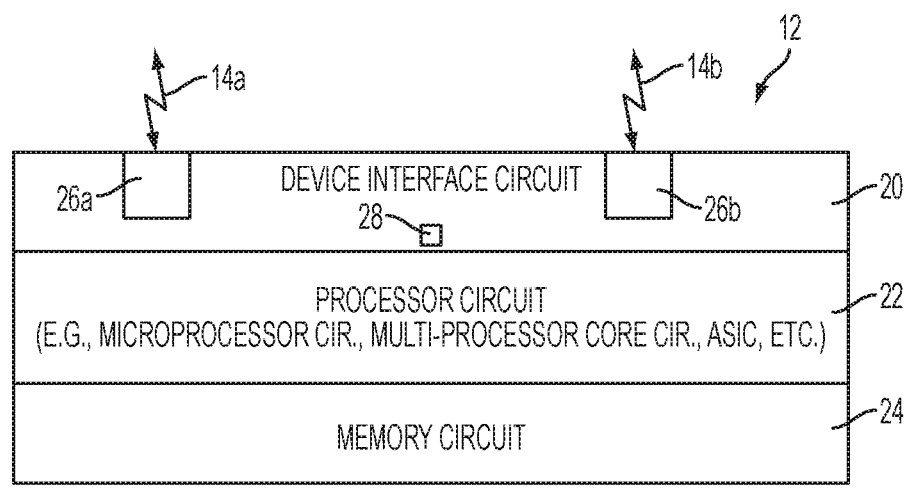
FIG. 2 illustrates an example implementation of any of the apparatus of FIG. 1.

FIG. 2 illustrates an example implementation of any one of the devices 12, of FIG. 1, according to an example embodiment. Each apparatus 12 can include a device interface circuit 20, a processor circuit 22, and a memory circuit 24. The device interface circuit 20 can include one or more distinct physical layer transceivers 26 for communication with any one of the other devices 12; for example, the single mode-only devices N2, N3, N4, and N5 can include an IEEE 802.15.4 transceiver 26*a*, and the single mode-only devices N10 and N11 can include a WiFi-Direct transceiver 26*b*. The multimode network devices N1, N6, N7, N8, and N9 can include both PHY transceivers 26*a* and 26*b*, plus additional media access control (MAC) layer circuitry 28 for storing and applying link layer parameters for the different transceivers 26*a* and 26*b* received from one or more advertisement messages 16.

The device interface circuit 20 also can include different PHY transceivers, as appropriate, for establishing connections using various access technologies such as IEEE802.15.4 (g/e/ . . . ), IEEE802.15.1 (Bluetooth), LTE, LTE-Direct, WiFi, and/or and Power Line Communication (PLC, IEEE1901), etc. via respective access protocols.

The processor circuit 22 can be configured for executing any of the operations described herein, and the memory circuit 24 can be configured for storing any data or data packets as described herein, including the link layer parameters received by any message 16.

Any of the disclosed circuits of the devices 12 (including the device interface circuit 20, the processor circuit 22, the memory circuit 24, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 24) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 24 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 24 can be implemented dynamically by the processor circuit 22, for example based on memory address assignment and partitioning executed by the processor circuit 22.

Figure 3:
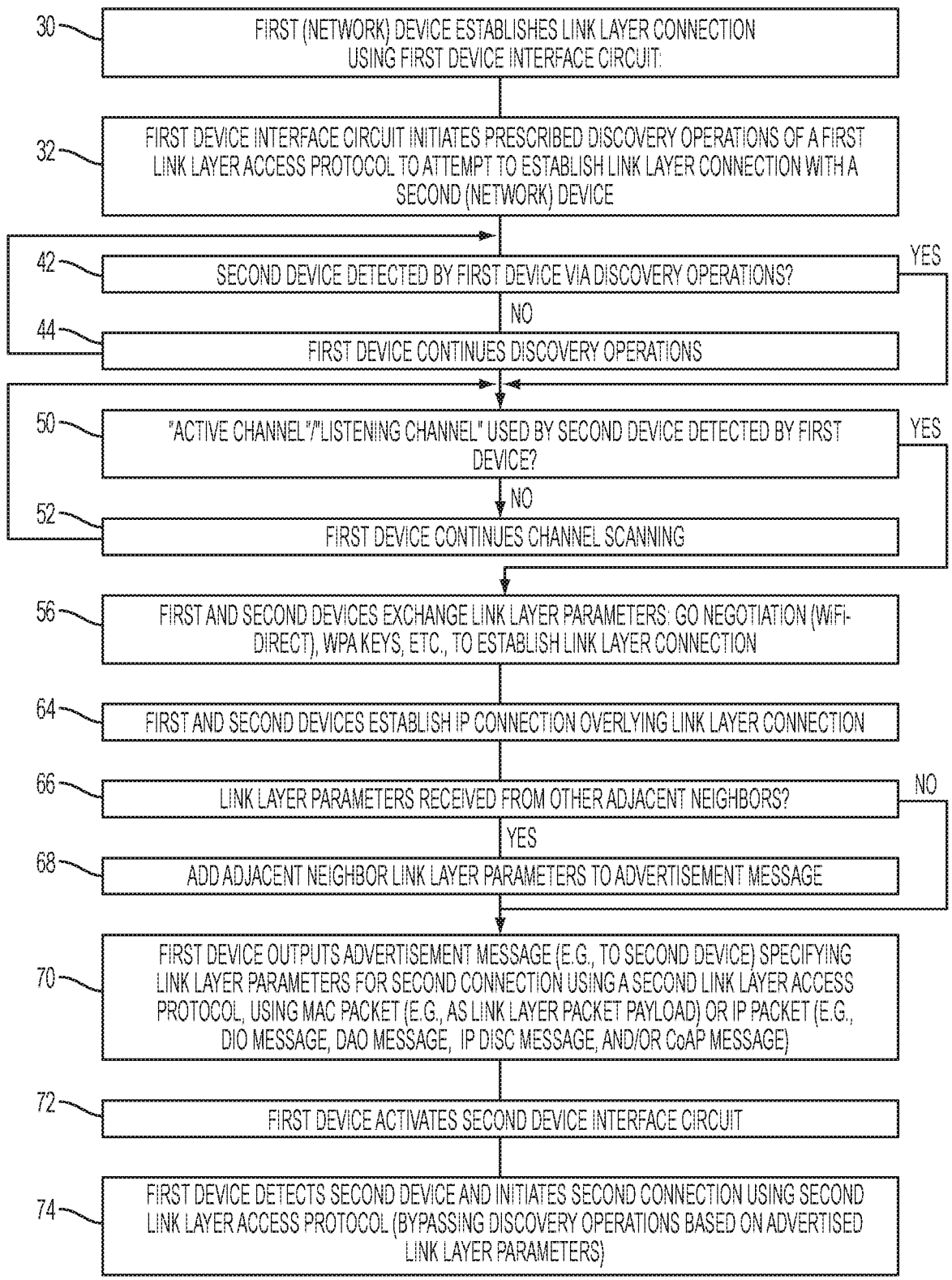
FIG. 3 illustrates an example method of an apparatus advertising link layer parameters for a second link layer access protocol, and minimizing discovery operations during establishment of a connection based on the link layer parameters of the second link layer access protocol, according to an example embodiment.

FIG. 3 illustrates an example method of an apparatus advertising link layer parameters for a second link layer access protocol, and minimizing discovery operations during establishment of a connection based on the link layer parameters of the second link layer access protocol, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIGS. 1A and 3, the processor circuit 22 (and/or the MAC circuit 28) can be configured for initiating in operation 30 establishment of a link layer connection 14 using one of the PHY transceivers (e.g., 26*a* or 26*b*) in the device interface circuit 20. Assuming the network device 12 does not have any link layer parameters of any other network device 12, the first PHY transceiver (e.g., 26*b*) in operation 32 can initiate prescribed discovery operations (62 of FIG. 4) for a first link layer access protocol (e.g., WiFi-Direct): unless specified otherwise, the term "discovery operation" refers to all operations required for a network device 12 to establish a link layer connection with another network device 12, including for example discovery phase, hierarchy negotiation (e.g., Group Owner (GO) negotiation), secure link provisioning including exchange of security keys (e.g., WPS provisioning), etc., up to but not including any higher-layer operations (e.g., IP address configuration).

Unless specified otherwise, the term "link layer" refers to any identifiable protocol layer (e.g., within the OSI Reference Model) or combination thereof that is required by a first network device establish a direct (i.e., one hop) data connection with a second network device for communicating data at least in one direction toward the second network device, up to but not including a network layer such as Internet Protocol; hence, parameters associated with a "link layer access protocol" can include a combination of physical layer (e.g., OSI layer 1 or "PHY" layer) parameters and link layer (e.g., OSI layer 2 or "MAC" layer) parameters, for example in access protocols that combine or integrate physical layer and link layer operations into a single or integrated protocol; in contrast, "link layer-only" refers to only the MAC layer ("MAC layer-only") or only OSI layer 2 ("layer 2-only"). Hence, "link layer" is not limited to "link layer-only".

Figure 4:
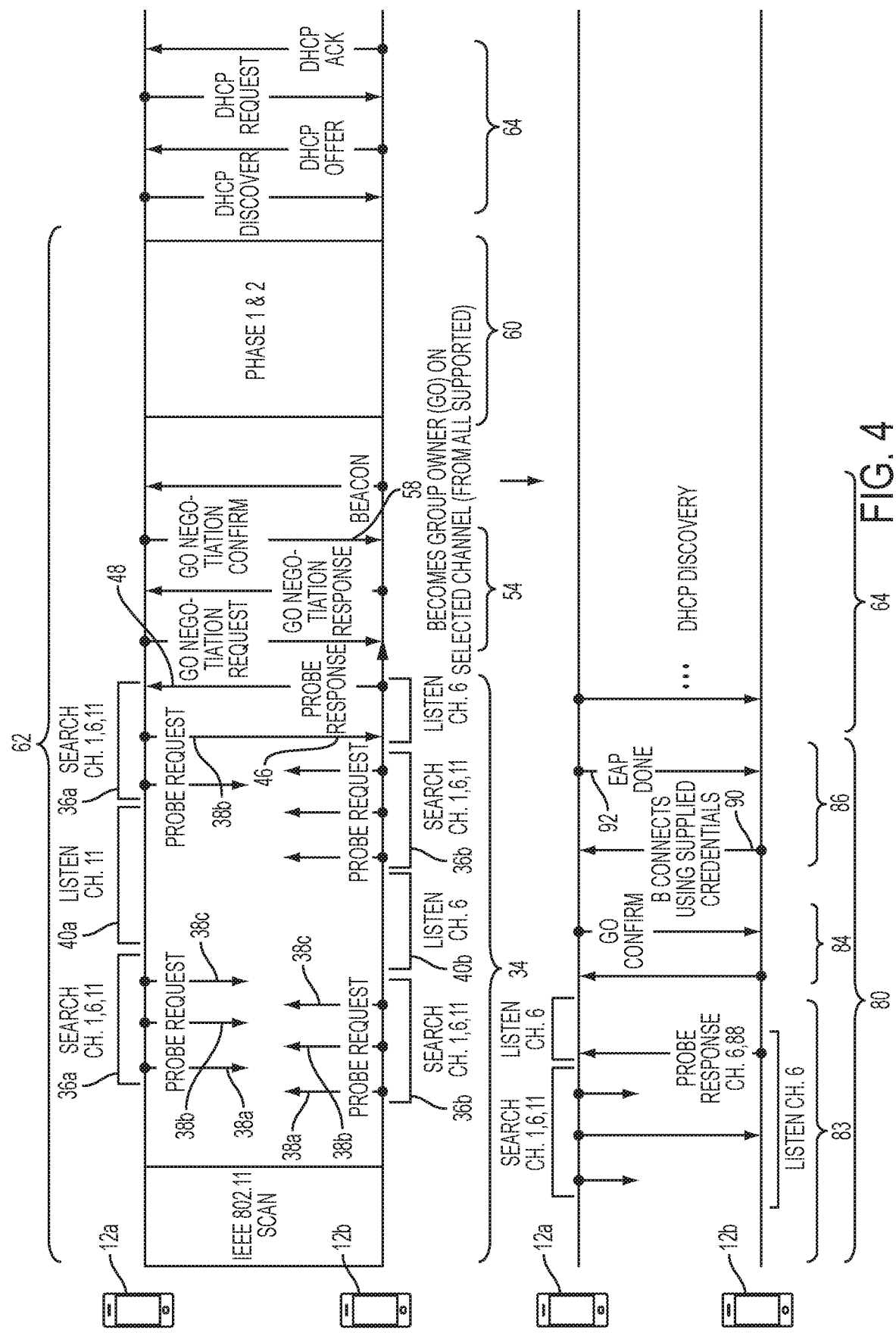
FIG. 4 illustrates minimizing discovery operations according to respective link layer access protocols, based on advertisement of respective link layer parameters, according to an example embodiment.

Referring to FIGS. 3 and 4, the processor circuit 22 (and/or the MAC circuit 28) of a network device 12a (e.g., "N8" of FIG. 1) and 12b (e.g., "N9" of FIG. 1) in operation 32 can initiate prescribed discovery operations 62 according to a prescribed link layer access protocol, for example WiFi-Direct, where the PHY transceiver circuit 26b of each network device 12a and 12b starts a discovery phase 34 based on entering a corresponding search phase 36a and 36b comprising transmitting a probe request 38a on RF channel "1", a probe request 38b on channel "6", and a probe request 38c on channel "11". The PHY transceiver circuit 26b of each network 12a and 12b initiates a listen phase 40a and 40b on a corresponding selected one of the channels; for example, the network device 12a can initiate its listen phase 40a on RF channel "11" and the network device 12b can initiate its listen phase 40b on RF channel "6"; however, since the search phases 36a and 36b substantially overlapped each other in time, the network devices 12a or 12b did not detect any of the probe requests 38a, 38b, or 38c from the peer devices 12b or 12a. Hence, since neither device 12a or 12b detected any of the probe requests 38a, 38b, or 38c from the other device in operation 42 of FIG. 3, the discovery operations (e.g., search phase 36a, 36b and listen phases 40a, 40b) are continued (e.g., repeated) in operation 44 of FIG. 3.

As illustrated in FIG. 4, the probe request 38b transmitted by the device 12a on RF channel "6" is detected at event 46 by the PHY circuit 26b of the network device 12b, causing the device 12b to output a probe response 48 on its listening RF channel "6". If in operation 50 of FIG. 3 the first network device 12a does not detect the probe response 48 on the "active channel" (or "listening channel") used by the second network device 12b, the first network device in operation 52 must continue channel scanning in the search phase 36a and listen phase 40a within the discovery phase 34.

Assuming the first network device 12a in operation 50 detects the probe response 48 transmitted by the network device 12b on RF channel "6", the first and second network devices 12a and 12b can initiate the GO negotiation phase 54 in operation 56, where each network device 12a and 12b transmit GO Intent values to determine which device should be identified as Group Owner based on having the highest relative GO Intent value. Following identification of a Group Owner at event 58 of FIG. 4, the devices 12a and 12b can initiate the WPS provisioning phase 60, including exchanging of WiFi Protected Access (WPA) keys, in order to establish a secure WiFi-Direct link 14b.

Hence, the prescribed discovery operation 62 of the WiFi-Direct protocol includes the prescribed discovery phase 34, the prescribed GO negotiation phase 54, and the WPS provisioning phase 60. The prescribed discovery operation 62 is completed to establish the secure WiFi-Direct link 14b before establishing in operation 64 an IP connection overlying any link layer connection 14, starting for example with a DHCP-based IP address configuration 64 in FIG. 4.

According to example embodiments, upon establishing at least a link layer connection 14 in operation 56, the processor circuit 22 and/or the MAC circuit 28 of a network device 12 can be configured for outputting in operation 70 of FIG. 3 an advertisement message 16 to an adjacent network device 12, where the advertisement message 16 specifies link layer parameters used to establish a second link layer connection according to a second link layer access protocol. For example, assuming with respect to FIG. 1A that the multimode network devices N1, N6, N7, N8, and N9 12 initially established first connections 14a according to a first link layer access protocol (e.g., IEEE 802.15.4), any one of the multimode network devices N1, N6, N7, N8, and/or N9 (e.g., "N8") can output in operation 70 an advertisement message 16 specifying the link layer parameters (82a of FIG. 5) to be used to establish a second connection (e.g., 14b) according to a second link layer access protocol (e.g., WiFi-Direct); the peer network device (e.g., "N7") 12, in response to receiving the advertisement message 16 (e.g., via connection 14a) specifying the WiFi-Direct link layer parameters used by the sourcing network device ("N8") to establish a second WiFi-Direct connection (e.g., 14b), can store the associated WiFi-Direct link layer parameters for the sourcing network device ("N8"), enabling the peer network device (e.g. "N7") to bypass at least a portion of the prescribed discovery operation (62 of FIG. 4) during establishment of a WiFi-Direct link 14b, based on the stored WiFi-Direct link layer parameters.

As illustrated in FIG. 1A and operation 70 of FIG. 3, the advertisement message specifying the link layer parameters can be output as a MAC packet 16a, a DIO message 16b (e.g., initiated by a DODAG root "N1"), a DAO message 16c that can be unicast to a prescribed destination such the DODAG root "N1" or another network device 12 (e.g., as an IP-based "Discovery" (Disc) message, described below), and/or a CoAP message according to RFC 7252.

Any network device receiving an advertisement message in operation 66 of FIG. 3 can add in operation 68 any received link layer parameters to its own advertisement message in operation 68, prior to transmission of the advertisement message in operation 70. For example, assume that the PHY device 26a of the network device "N7" FIG. 1A in operation 66 receives on an IEEE 802.15.4 link 14a a DAO message 16c specifying the link layer parameters used by the adjacent network device "N8" for establishing a WiFi-Direct link 14b ("N8(WiFi-Direct)"), the network device "N7" in operation 68 can add the link layer parameters "N8(WiFi-Direct)" to its own DAO message 16c, specifying its own link layer parameters for establishing a WiFi-Direct Link ("N7(WiFi-Direct)") and the received link layer parameters "N8(WiFi-Direct)". The DAO message 16c is output in operation 70 by the network device "N7" via its IEEE 802.15.4 link 14a to the network device "N6", enabling the network device "N6" to determine the link layer parameters "N7(WiFi-Direct)" for establishing in operation 72 and 74 a link 14b with the network device "N7", and the link layer parameters "N8(WiFi-Direct)" for establishing in operation 74 another link 14b with the network device "N8". In particular, the network device "N6" can activate in operation 72 its second device interface circuit 26b as needed, for example based on determining that data traffic needs to be sent on another link 14b due to a determined need, for example identifiable QoS requirements that can be better handled on the other link 14*b* via the second device interface circuit 26*b*. Since the network device "N6" already has stored the link layer parameters "N8(WiFi-Direct)" (e.g., in the MAC layer circuit 28 and/or the memory circuit 24), the network device "N6" in operation 74 can bypass existing discovery operations and apply the stored link layer parameters "N8(WiFi-Direct)" to establish the link layer connection 14*b* with the network device "N8". As described previously, any of the multimode network devices can operate in concurrent mode or non-concurrent mode depending on implementation preference.

Similarly, a DIO message 16*b* generated and multicast by the DODAG root "N1" onto its IEEE 802.15.4 links 14*a* can specify link layer parameters (82*a* of FIG. 5) used by the DODAG root "N1" for establishing a WiFi-Direct link 14*b* ("N1(WiFi-Direct)"), enabling the network device "N6" to establish in operation 74 another link 14*b* with the network device "N1" (based on the network device "N5" forwarding the DIO message 16*b* to the network device "N6"). The network device "N6" also can add its own link layer parameters ("N6(WiFi-Direct)") prior to outputting the DIO message 16*b* to the attached network device "N7". Hence, link layer parameters of different network devices can be aggregated as a DIO message 16*b* traverses along different hops of a path. It should be noted that "two-way" advertisement is not necessary between network devices, rather discovery operations can be minimized based on only one of the peer devices 12 receiving an advertisement message 16 from a peer device.

The example embodiments also can utilize an IP-based "Discovery" (IP Disc) message, illustrated in operation 70, where an advertising network device (e.g., "N8") can output (unicast or multicast) a modified version of a DAO message 16*c*. According to an example embodiment, an IP Disc message output by the advertising network device (e.g., "N8") is a modified version of a DAO message 16*c* specifying discovery related information (including advertised link layer parameters 82 of FIG. 5) and that is destined for a target network device (e.g., "N13" or "N12") other than the parent (e.g., "N7") of the advertising network device. The IP Disc message can be unicast based on explicitly specifying the target network device; alternately, the IP Disc message can be multicast with a flag specifying the IP Disc message is to aid in discovery of access technology parameters.

The example embodiments also can limit the scope of aggregating and/or forwarding of the discovery related information as described herein, for example a limited network distance based on a determined number of hops (e.g., determined heuristically), a limited physical distance based on physical/geographical location of an advertising network device, and/or transmission distance (relative to the coverage range of the links 14).

Hence, FIG. 1B illustrates how the multimode network devices N1, N6, N7, N8, and N9, having initially established the network links 14*a* according to IEEE 802.15.4 link layer access protocol, can establish the WiFi-Direct links 16*b* based on bypassing the prescribed discovery operation 62 using the advertised link layer parameters (82*a* of FIG. 5), enabling establishment of the network links 14*b* according to a reduced discovery operation 80 of FIG. 4.

Figure 5:
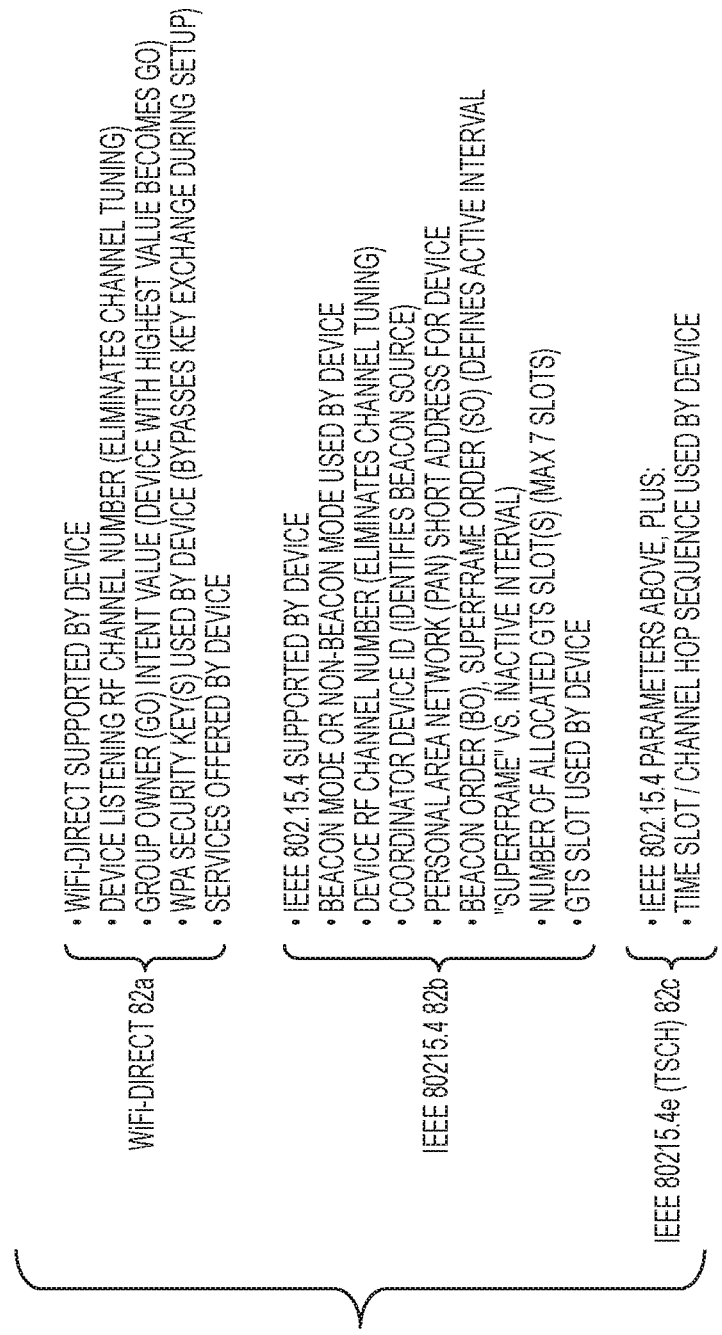
FIG. 5 illustrates example link layer parameters that can be advertised to minimize or bypass a corresponding discovery operation of a link layer access protocol, according to an example embodiment.

FIG. 5 illustrates example link layer parameters 82 that can be advertised for different access technologies that are implemented using respective link layer access protocols, including link layer parameters 82*a* for Wi-Fi Direct, link layer parameters 82*b* for IEEE 802.15.4, and/or link layer parameters 82*c* (in addition to 82*b*) for IEEE 802.15.4e for Time Slotted Channel Hopping (TSCH).

Advertisement of the link layer parameters 82*a* enables the reduced discovery operations 80 of FIG. 4, including a reduced channel discovery 83, a reduced GO negotiation 84, and a reduced WPS provisioning 86. As illustrated in FIG. 5, the network device 12*b*, in response to receiving the link layer parameters 82*a* (e.g., via another connection 14*a*), can determine that: Wi-Fi Direct is supported by the network device 12*a*; that network device 12*a* uses RF channel "6" as its listening channel; the GO Intent value used by network device 12*a*; WPA security keys used by the network device 12*a*; and/or any other network services offered by the network device 12*a*. In response, the network device 12*b* can bypass the search phase 36*b* by initiating listening on RF channel "6" as identified in the link layer parameters 82, enabling the immediate probe response on RF channel "6" at event 88; the network device 12*b* also can bypass the GO negotiation 54 by sending a new GO declaration message 90 declaring the network device 12*b* as a GO owner (assuming the network device 12*b* has a higher GO Intent value than advertised by the network device 12*a* in the link layer parameters 82*a*), or declaring the network device 12*b* as acknowledging the network device 12*a* as Group owner (assuming the network device 12*b* has a lower GO Intent value than advertised by the network device 12*a* in the link layer parameters 82*a*). The network device 12*b* also can bypass existing WPS provisioning 60 by using shortened WPS provisioning, for example including a copy of the WPA security key claimed by the network device 12*a* in any transmitted message 90 for authentication purposes, enabling the network device 12*a* to send a message 92 acknowledging that extensible authentication protocol (EAP) is completed.

FIG. 5 illustrates link layer parameters 82*b* that can be advertised by a network device (e.g., "N6") as used to establish a link layer connection 14*a* according to IEEE 802.15.4 protocol. Advertisement of the link layer parameters 82*b* enables a network device to minimize discovery operations associated with determining time-synchronized frame boundaries based on beacon intervals, identification of an active period for a superframe (i.e., superframe duration), identification of whether there is any inactive period following the active period, identification of a contention access period, identification of any contention free period and any guaranteed time slots allocated to a network device, etc. Example parameters can include: identifying that the network device (e.g., "N6") supports IEEE 802.15.4; identifying whether Beacon mode or Non-beacon mode is used by the device; Device RF channel number used by the network device (which can eliminate channel tuning from among the 27 available channels); Coordinator Device Identifier for identification of a beacon source that establishes the boundaries of a 802.15.4 frame; Personal Area Network (PAN) short address used by the network device (e.g., "N6"); Beacon Order (BO) (defining the entire frame duration for a given channel) and Superframe Order (SO) (defining the superframe duration); any number of allocated Guaranteed Time Slots (GTSs); and an identification of any GTS allocated to the network device (e.g., "N6").

Hence, in response to receiving an advertisement message 16 specifying the link layer parameters 82*b*, an network device 12 can bypass existing discovery operations based on applying the link layer parameters to initiate frame boundary alignment, identification of contention access period (CAP) versus contention free period (CFP), etc., without waiting for reception of two successive beacons (which can take up to 251.65 seconds). If an advertisement message 16 also includes TSCH parameters 82*c*, a network device 12 can determine the time slotted channel hopping sequence allocated to the advertising network device.

According to example embodiments, discovery operations according to a link layer access protocol can be minimized by bypassing at least a portion thereof using link layer parameters having been received via a different connection.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   establishing, by a first network device in a mesh network, a first wireless connection with a second network device according to first link layer parameters discovered based on a prescribed discovery operation of a first link layer access protocol;
   advertising via the first wireless connection, by the first network device to the second network device, second link layer parameters required by the first network device to establish a second wireless connection according to a second link layer access protocol, the second link layer parameters different than the first link layer parameters; and
   the first network device minimizing a corresponding discovery operation of the second link layer access protocol during establishment of the second wireless connection with the second network device, based on the second link layer parameters advertised by the first network device to the second network device causing the second network device to bypass at least a portion of the corresponding discovery operation of the second link layer access protocol by applying the second link layer parameters advertised via the first wireless connection instead of learning the second link layer parameters via the corresponding discovery operation.

2. The method of claim 1, further comprising:
   receiving, via a third wireless connection established with a third network device according to the first link layer access protocol, third link layer parameters required by the third network device to establish a wireless connection according to the second link layer access protocol;
   the first network device minimizing the corresponding discovery operation of the second link layer access protocol during establishment of the wireless connection with the third network device, based on the third link layer parameters advertised by the third network device.

3. The method of claim 2, wherein the advertising comprises advertising, via the first wireless connection to the second network device, the third link layer parameters required by the third network device to establish the wireless connection according to the second link layer access protocol, enabling the second network device and third network device to establish the wireless connection based on minimizing the discovery operation of the second link layer access protocol using the third link layer parameters.

4. The method of claim 1, wherein the advertising includes encapsulating the second link layer parameters into a payload of a link layer packet, and transmitting the link layer packet via the first wireless connection.

5. The method of claim 1, wherein the advertising includes encapsulating the second link layer parameters into an Internet Protocol (IP) packet, and transmitting the IP packet on an IP network connection overlying the first wireless connection in an IP based topology.

6. The method of claim 5, wherein the IP packet containing the second link layer parameters is output by the first network device as at least one of a Destination Oriented Directed Acyclic Graph (DODAG) Information Object (DIO), a Destination Advertisement Object (DAO), or a Constrained Application Protocol (CoAP) message.

7. The method of claim 1, wherein the second link layer parameters advertised to establish the second wireless connection include at least one of a device Radio Frequency (RF) channel number used by the first network device to eliminate channel tuning during setup of the second wireless connection, Group Owner (GO) Intent Value to bypass GO negotiation during setup of the second wireless connection, security keys to bypass key exchange during setup of the second wireless connection, or services offered by the first network device to eliminate service queries during setup of the second wireless connection.

8. The method of claim 1, where the second link layer parameters advertised to establish the second wireless connection include at least one of a device Radio Frequency (RF) channel number used by the first network device to eliminate channel tuning during setup of the second wireless connection, identifying whether beacon mode or non-beacon mode is used by the first network device, identifying a source of a beacon in beacon mode, beacon order and superframe order parameters, number of allocated guaranteed time slots (GTS) within a superframe, or identification of a GTS allocated to the first network device.

9. An apparatus comprising:
   a first device interface circuit configured for establishing, in a mesh network, a first wireless connection with a network device according to first link layer parameters discovered based on a prescribed discovery operation of a first link layer access protocol;
   a circuit configured for outputting to the network device, via the first wireless connection established by the first device interface circuit, an advertisement specifying second link layer parameters required by the apparatus to establish a second wireless connection according to a second link layer access protocol, the second link layer parameters different than the first link layer parameters; and
   a second device interface circuit configured for minimizing a corresponding discovery operation of the second link layer access protocol during establishment of the second wireless connection with the network device, based on the second link layer parameters specified in the advertisement causing the network device to bypass at least a portion of the corresponding discovery operation of the second link layer access protocol by applying the second link layer parameters advertised via the first wireless connection instead of learning the second link layer parameters via the corresponding discovery operation.

10. The apparatus of claim 9, wherein:
    the first device interface circuit is configured for receiving, via a third wireless connection established with a second network device according to the first link layer access protocol, third link layer parameters required by the second network device to establish a wireless connection according to the second link layer access protocol;

the second device interface circuit configured for minimizing the corresponding discovery operation of the second link layer access protocol during establishment of the wireless connection with the second network device, based on the third link layer parameters advertised by the second network device.

11. The apparatus of claim 10, wherein the circuit is configured for adding to the advertisement, for transmission via the first device interface circuit, the third link layer parameters required by the second network device to establish the wireless connection according to the second link layer access protocol, enabling the network device and second network device to establish the wireless connection based on minimizing the discovery operation of the second link layer access protocol using the third link layer parameters.

12. The apparatus of claim 9, wherein the advertising includes encapsulating the second link layer parameters into a payload of a link layer packet, and transmitting the link layer packet via the first wireless connection.

13. The apparatus of claim 9, wherein the advertising includes encapsulating the second link layer parameters into an Internet Protocol (IP) packet, and transmitting the IP packet on an IP network connection overlying the first wireless connection in an IP based topology.

14. The apparatus of claim 13, wherein the IP packet containing the second link layer parameters is output by the apparatus as at least one of a Destination Oriented Directed Acyclic Graph (DODAG) Information Object (DIO), a Destination Advertisement Object (DAO), or a Constrained Application Protocol (CoAP) message.

15. The apparatus of claim 9, wherein the second link layer parameters advertised to establish the second wireless connection include at least one of a device Radio Frequency (RF) channel number used by the apparatus to eliminate channel tuning during setup of the second wireless connection, Group Owner (GO) Intent Value to bypass GO negotiation during setup of the second wireless connection, security keys to bypass key exchange during setup of the second wireless connection, or services offered by the apparatus to eliminate service queries during setup of the second wireless connection.

16. The apparatus of claim 9, where the second link layer parameters advertised to establish the second wireless connection include at least one of a device Radio Frequency (RF) channel number used by the apparatus to eliminate channel tuning during setup of the second wireless connection, identifying whether beacon mode or non-beacon mode is used by the apparatus, identifying a source of a beacon in beacon mode, beacon order and superframe order parameters, number of allocated guaranteed time slots (GTS) within a superframe, or identification of a GTS allocated to the apparatus.

17. One or more non-transitory tangible media encoded with logic for execution by a machine and when executed by the machine operable for:

establishing, by the machine implemented as a first network device in a mesh network, a first wireless connection with a second network device according to first link layer parameters discovered based on a prescribed discovery operation of a first link layer access protocol;

advertising via the first wireless connection, by the first network device to the second network device, second link layer parameters required by the first network device to establish a second wireless connection according to a second link layer access protocol, the second link layer parameters different than the first link layer parameters; and the first network device minimizing a corresponding discovery operation of the second link layer access protocol during establishment of the second wireless connection with the second network device, based on the second link layer parameters advertised by the first network device to the second network device causing the second network device to bypass at least a portion of the corresponding discovery operation of the second link layer access protocol by applying the second link layer parameters advertised via the first wireless connection instead of learning the second link layer parameters via the corresponding discovery operation.

18. The one or more non-transitory tangible media of claim 17, further operable for:

receiving, via a third wireless connection established with a third network device according to the first link layer access protocol, third link layer parameters required by the third network device to establish a wireless connection according to the second link layer access protocol;

the first network device minimizing the corresponding discovery operation of the second link layer access protocol during establishment of the wireless connection with the third network device, based on the third link layer parameters advertised by the third network device.

19. The one or more non-transitory tangible media of claim 17, wherein the advertising includes encapsulating the second link layer parameters into a payload of a link layer packet, and transmitting the link layer packet via the first wireless connection.

20. The one or more non-transitory tangible media of claim 17, wherein the second link layer parameters advertised to establish the second wireless connection include at least one of a device Radio Frequency (RF) channel number used by the first network device to eliminate channel tuning during setup of the second wireless connection, Group Owner (GO) Intent Value to bypass GO negotiation during setup of the second wireless connection, security keys to bypass key exchange during setup of the second wireless connection, or services offered by the first network devices to eliminate service queries during setup of the second wireless connection.

* * * * *